(12) United States Patent
Fischer

(10) Patent No.: US 8,247,770 B2
(45) Date of Patent: Aug. 21, 2012

(54) THERMAL IMAGING CAMERA AND METHOD FOR THE DETERMINATION OF THE LENS PARAMETERS OF AN IR INTERCHANGEABLE LENS OF A THERMAL IMAGING CAMERA

(75) Inventor: Jörn Fischer, Freiburg (DE)

(73) Assignee: Testo AG (DE)

( * ) Notice: Subject to any disclaimer, the term of this patent is extended or adjusted under 35 U.S.C. 154(b) by 367 days.

(21) Appl. No.: 12/716,005

(22) Filed: Mar. 2, 2010

(65) Prior Publication Data

US 2011/0215244 A1   Sep. 8, 2011

(51) Int. Cl.
*G01J 5/00* (2006.01)

(52) U.S. Cl. ...................................... 250/338.1

(58) Field of Classification Search ................. 250/338.1
See application file for complete search history.

(56) References Cited

U.S. PATENT DOCUMENTS

2007/0065014 A1 *   3/2007   Owechko et al. ............. 382/190
* cited by examiner

*Primary Examiner* — David Porta
*Assistant Examiner* — Hugh H Maupin
(74) *Attorney, Agent, or Firm* — Hoffmann & Baron, LLP

(57) ABSTRACT

In a thermal imaging camera (1) with an IR sensor arrangement (2) and an interchangeable IR lens (5), an image processing unit (12) and a data processing unit (13) are provided with which at least one feature (8, 9) can be extracted from a recorded IR image (6) and a numerical value (14) can be derived from this feature, wherein the numerical value (14) is determined by the distortion of the interchangeable IR lens (5), and a mapping (16) of lens characteristics (17, 18, 19) with the determinable numerical values (14) is stored.

12 Claims, 2 Drawing Sheets

| Distortion Data | Lens Number | Transmittance |
|---|---|---|
| <1,05 | 13 | 0.99 |
| 1,05 .. 1,07999 | 5 | 0.96 |
| 1,08 .. 1.24 | 7 | 0.987 |
| >1.24 | 4 | 0.956 |

THERMAL IMAGING CAMERA AND METHOD FOR THE DETERMINATION OF THE LENS PARAMETERS OF AN IR INTERCHANGEABLE LENS OF A THERMAL IMAGING CAMERA

The invention relates to a thermal imaging camera with an IR sensor arrangement, an output unit for the processed sensor data, and an interchangeable IR lens.

The invention further relates to a method for determining lens characteristics of an interchangeable IR lens of a thermal imaging camera.

Furnishing thermal imaging cameras with interchangeable IR lenses are known in order to enlarge their field of use. Since the different interchangeable lenses have different transmission coefficients and other different lens characteristics that influence the results in the IR temperature measurement, not taking the properties of the interchangeable IR lens into account can lead to measurement errors.

A known measure is therefore to store information on such lens characteristics on the interchangeable IR lenses by means of markings, electronic storage media and the like and to read this information out with the thermal imaging camera when it is used. This requires a careful matching of the usable interchangeable IR lenses to the thermal imaging camera and vice versa.

Alternatively there is the possibility of inputting lens-specific parameters manually into the thermal imaging camera in order to adapt the processing of the recorded sensor data for the thermal imaging camera to the respective interchangeable lens that was chosen. However, this requires increased care by the user in order to avoid measurement errors, for example, for temperature measurement from the IR image.

The invention is based on the problem of simplifying the use of thermal imaging cameras with interchangeable IR lenses.

In a thermal imaging camera of the type mentioned above, it is provided according to the invention in order to solve the problem that the interchangeable IR lens features distortion, that an imaging processing unit is constructed and designed for extracting at least one feature from at least one IR image recorded with the IR sensor arrangement, with the one or more features being influenced by the distortion, and that a data processing unit is constructed and designed for extracting a numerical value determined by the distortion of the interchangeable IR lens from the one or more extracted features. It is advantageous that the focal length can be determined from the distortion by conventionally known optical formulas, so that an automated recognition of optical features of the currently mounted interchangeable IR lens is possible. It is also not necessary to construct the interchangeable IR lens in a special manner; instead, any desired interchangeable IR lenses can be used.

The distortion can be defined, for example, by a coefficient or several coefficients of a series expansion that describes the deviation of an imaged circle from the circular shape.

It is favorable if a mapping of lens characteristics to the numerical values that can be determined with the data processing unit is stored. Thus additional lens characteristics that are useful in processing sensor data but not directly associated with the distortion can be determined. The numerical value determined by the distortion can thus be used as a fingerprint of the respective interchangeable IR lens. It has been shown that the case where different interchangeable IR lenses feature identical distortion practically does not occur or occurs at least very rarely. If such ambiguities should appear, the user can easily be prompted with a question to make a selection, for example, by indicating a manufacturer. It is additionally advantageous that the mapping stored in the memory unit can be continuously updated to cover additional interchangeable IR lenses.

For fully automatic recognition of the interchangeable IR lens, it can be provided that a data readout unit is constructed and set up to read out stored lens characteristics for the numerical value determined by the data processing unit.

For many applications it is sufficient if the stored lens characteristics comprise one or more of the following lens characteristics: focal length, transmission coefficient(s), distortion, or photographic luminous intensity. The storage of the distortion has the advantage that the numerical value initially must be determined only within a range of precision until the interchangeable IR lens has been unambiguously determined, and that subsequently the exact numerical value of the distortion can be used in the processing of the IR image, for example, the correction of imaging errors.

It can be provided that the one or more extracted features are edges. It has been seen that the curvature of actually straight linear structures in the IR image can be advantageously used to determine the distortion.

For example, it can be provided in this regard that the numerical value is determined by the preferably averaged radius of curvature of at least one linear structure in the image.

Good results can be achieved if the image processing unit is set up to evaluate different image areas of one or more recorded IR images. For example, at least one peripheral area and at least one central area can be evaluated, since the distortion in the peripheral area is greater than in the central area.

To solve the problem, it is provided in a method of the type mentioned above that at least one IR image is recorded with the interchangeable IR lens, that at least one feature is extracted from the one or more IR images, with the one or more features being influenced by the distortion of the interchangeable IR lens, that a numerical value determined by the distortion of the interchangeable IR lens is derived from the one or more features, and that at least one lens characteristic correlated with the derived numerical value is read out from a stored mapping of lens characteristics with numerical values.

To determine the distortion it can be provided that the one or more extracted features are edges. It is advantageous that edges are easily detectable and that the curvature of an edge that is actually straight permits inferences on the distortion.

It can be provided that one or more of the following lens characteristics are stored: focal length, transmission coefficient(s), distortion, or photographic luminous intensity.

To determine the distortion, it can be provided that at least two recorded IR images are evaluated during the feature extraction, in particular, that a peripheral area is evaluated in a first IR image and a central area in a second IR image. The invention thus takes advantage of the effect that the distortion is greater in peripheral areas than in the central area. Thus the distortion can be inferred by comparison of the extracted features.

It can be provided in this regard that at least one radius of curvature of a linear structure in the one or more IR images is determined in order to derive the numerical value.

For approximate detection of edges, it can be provided that a vector field is calculated for the one or more IR images by means of a color level or gray level progression. The vectors of the vector field can preferably describe normalized gradients that are derived from the color level or gray level progression.

It can be provided that a vector summed up over a partial area of the IR image is calculated from the vector field. Thus an averaged numerical value can be used to determine the distortion. It is favorable if the partial area is provided by a quadrant of the IR image.

It can be provided that curved lines or curved color progressions in the recorded IR image are approximated as respective circular segments. Subsequently all the vectors in the direction of the center of the circle can be calculated for these circular segments, with the length of the vectors constituting a measure of the intensity of the curvature. If the vectors of a quadrant are summed up, this yields a measure of the distortion of the interchangeable IR lens with which the IR image was recorded.

The reliability of the method according to the invention can be further increased if, from the summed up vectors for a series of IR images, a vector averaged over the series is calculated.

In order to be able to do without the presence of straight edges, it can be provided that an object is imaged in a sequence of at least two IR images in different image areas, in particular, in a peripheral area and a central area, that the object is identified in the two or more IR images, that at least one feature is extracted from the imaged object for each IR image, and that the numerical value is derived from the comparison of the extracted features. Since the distortion is greater at the periphery than in the center, the distortion can be determined by comparison.

For this purpose, it can be provided that the movement of the object between two successive IR images is determined by calculation of the mapping and/or by a motion sensor.

The method according to the invention can be advantageously used in a method for processing an IR image taken with a thermal imaging camera in which at least one lens characteristic is determined in a method according to the invention and in which the one or more lens characteristics are used in the processing of the recorded IR image. Thus the characteristics of the interchangeable IR lens can be easily taken into account for a temperature measurement derived from the IR image and for a correction of imaging errors. These characteristics need not even be known to the user.

The invention will now be described in detail with reference to an exemplary embodiment.

In a schematized representation,

Figure 1:
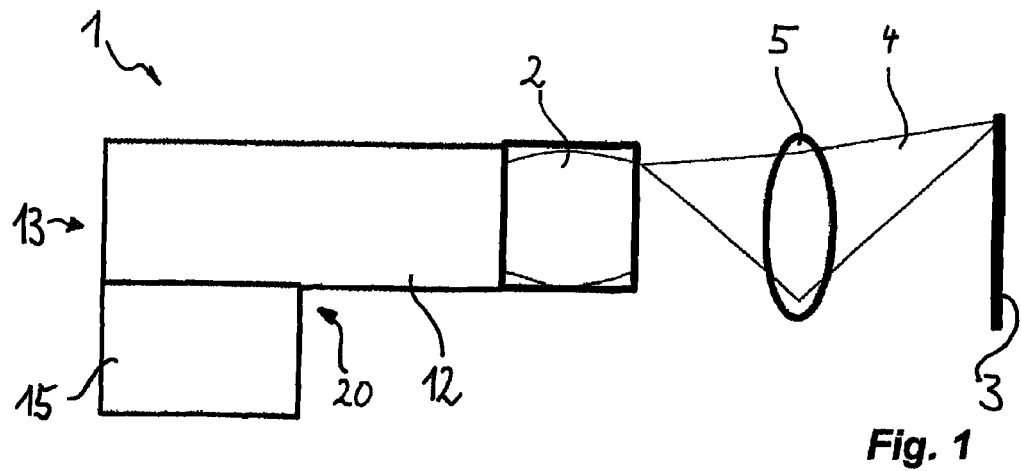
FIG. 1 shows a thermal imaging camera according to the invention.

In a schematic representation, FIG. 1 shows a thermal imaging camera marked 1 overall.

Thermal imaging camera 1 has an IR sensor arrangement 2 that detects IR radiation 4 emitted from an object 3 in order to prepare an IR image.

An interchangeable IR lens 5, with which IR radiation 4 is directed onto IR sensor arrangement 2, is provided on thermal imaging camera 1.

Interchangeable IR lens 5 influences IR radiation 4 such that, if the optical properties of interchangeable IR lens 5 are not taken into account, measurement errors can occur in the evaluation of the IR image taken by IR sensor arrangement 2.

Figure 3:
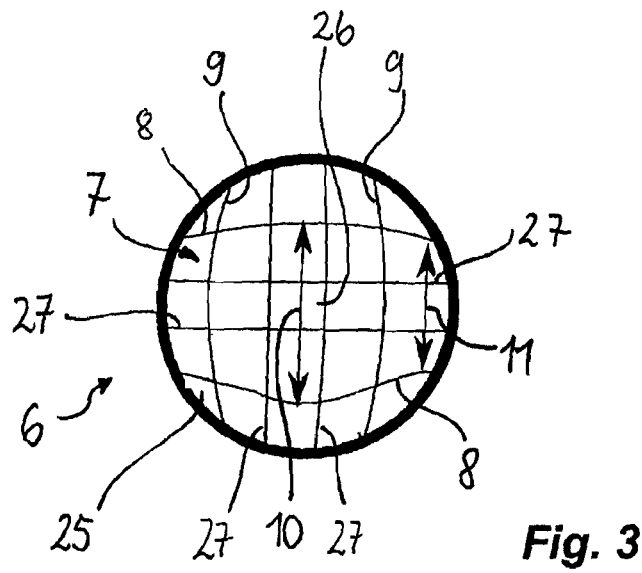
FIG. 3 shows an IR image with distortion in a simplified representation.

FIG. 3 shows such an IR image 6 as an example in a schematic sketch.

To explain the principle, the IR image is intended to show a picture of a lattice 7 of parallel sets of intersecting lines 8, 9.

It is evident that the lines 8, which are actually running in parallel, have a varying separation 10, 11 from one another in IR image 6, which can be traced back to the distortion of the interchangeable IR lens 5.

Thermal imaging camera 1 has an image processing unit 12 with which the lines 8, 9 can be extracted as features from IR image 6.

Thus, features—edges in the present embodiment—are present that are influenced by the distortion of interchangeable IR lens 5.

Thermal imaging camera 1 further comprises a data processing unit 13 with which a numerical value 14 (cf. FIG. 4) that is determined by the distortion of interchangeable IR lens 5 can be derived or calculated from the extracted features, i.e., lines 8, 9.

For example, the quotient of the distances 10, 11 between lines 8 can be determined, which allows a deduction of the distortion of interchangeable IR lens 5. It is also possible to determine radii of curvature, or parameters connected to the curvature of a line, for lines 8, 9 in IR image 5.

Thermal imaging camera 1 further comprises a storage unit 15 in which a mapping 16 of lens characteristics 17 to the numerical values 14 that can be determined from the extracted features by data processing unit 13 is stored.

Figure 4:
FIG. 4 shows a stored mapping of lens characteristics in accordance with the invention.

FIG. 4 shows a mapping 16 that contains possible numerical values 14 in one column, and a lens designation 18 and a transmittance 19 in other columns, wherein the mapping follows from the division into rows. Other lens characteristics 17 can also be stored.

Thermal imaging camera 1 further comprises a data read-out unit 20 with which, for a numerical value 14 determined by data processing unit 13, the associated lens characteristics 17 can be read out of storage unit 15 and made available.

Image processing unit 12, data processing unit 13, storage unit 15 and data readout unit 20 can be integrated in whole or in part in a common unit.

The lens characteristics 17 of interchangeable IR lens 5 provided in this manner can then be used for further processing of IR image 6, for example, for determining an absolute temperature value or for correcting imaging errors, in particular the distortion of the interchangeable IR lens.

Figure 2:
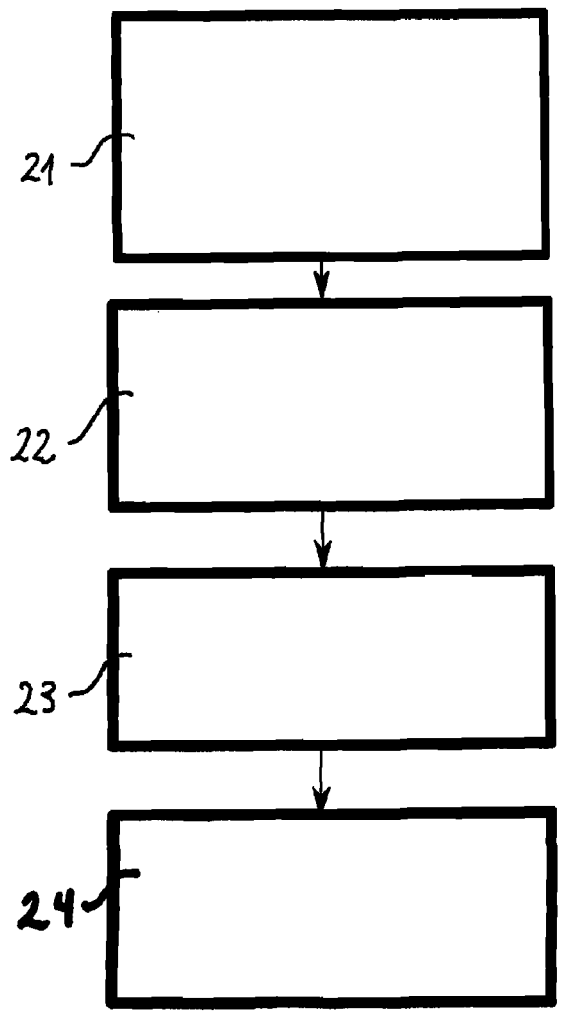
FIG. 2 shows the principle of a sequence plan of a method according to the invention.

The method according to the invention, shown simplified in FIG. 2, thus provides for recording an IR image 5 in a first step 21.

In second step 22, it is provided that at least one feature 8, 9 is extracted and a numerical value 14 determined by the distortion of interchangeable IR lens 5 is derived from the extracted feature 8, 9.

In a third step 23, at least one associated lens characteristic 17, 18, 19 is read out from a stored mapping 16 for the numerical value 14.

In the fourth step 24, the one or more read-out lens characteristics 17, 8, 19 are used for removing image distortion, for calculating the temperature, or in general for processing IR image 6 in thermal imaging camera 1.

Finally, the thus-processed IR image 6 is output or displayed with the aid of an output means, not shown in detail, a display, or a data interface or the like.

In the second step 22, the extraction of features 8, 9 and the numerical values 14 derived from these features is used to distinguish between features that are derived from a peripheral area 25 of the IR image 6 and features that are derived from a central area 26 of this image or from a different IR image.

In FIG. 3 it is indicated that the effect of the distortion of the interchangeable IR lens 5 in the central area 26 is less than in the peripheral area 25. For example, the lines 27 running through the central area 26 can be extracted as features from which numerical values can be derived and that can be used as references. The numerical values 14 that are derived from the lines 8, 9 arranged in the peripheral area 25 can then refer to these reference values, in order to obtain a numerical value 14 for the characterization of the distortion of the interchangeable IR lens 5.

In FIG. 2, it is not shown further that a plurality of numerical values 14 is determined according to the described method and that an average value is then formed by means of this plurality of numerical values 14, in order to reduce random noise effects in the determination of the distortion of the interchangeable IR lens 5.

In the case of the thermal imaging camera 1 with an IR sensor arrangement 2 and an interchangeable IR lens 5, an image processing unit 12 and a data processing unit 13 are provided with which at least one feature 8, 9 can be extracted from a recorded IR image 6 and a numerical value 14 can be derived from this feature, with the numerical value 14 being defined by the distortion of the interchangeable IR lens 5 and a mapping 16 of lens characteristics 17, 18, 19 to the determinable numerical values 14 being stored.

The invention claimed is:

1. Thermal imaging camera (1) with an IR sensor arrangement (2), an output unit for the processed sensor data and an interchangeable IR lens (5), characterized in that the interchangeable IR lens (5) features distortion, in that an image processing unit (12) is constructed and this image processing unit (12) is designed to extract at least one feature from at least one IR image (6) recorded with IR sensor arrangement (2), wherein the one or more features are influenced by the distortion of interchangeable IR lens (5), and in that a data processing unit (13) is constructed and designed to derive a numerical value (14) that is determined by the distortion of interchangeable IR lens (5) from the one or more extracted features.

2. Thermal imaging camera (1) according to claim 1, characterized in that a mapping (16) of lens characteristics (17, 18, 19) to numerical values (14) that can be determined with data processing unit (13) is stored in a memory unit (15) and/or in that a data readout unit (20) is formed and is designed for reading out stored lens characteristics (17, 18, 19) for the numerical value (14) determined with data processing unit (13).

3. Thermal imaging camera (1) according to claim 2, characterized in that the stored lens characteristics (17, 18, 19) comprise one or more of the following lens characteristics: focal length, transmission coefficient(s) (19), distortion, or photographic luminous intensity.

4. Thermal imaging camera (1) according to claim 1, characterized in that the one or more extracted features are edges and/or that the numerical value is determined by the preferably averaged radius of curvature of at least one linear structure (7, 8, 9, 27) in IR image (6).

5. Thermal imaging camera (1) according to claim 1, characterized in that image processing unit (12) is set up for evaluating different image areas (25, 26), in particular, at least one peripheral area (25) and at least one central area (26) of one or more recorded IR images (6).

6. Method for determining lens characteristics (17, 18, 19) of an interchangeable IR lens (5) of a thermal imaging camera (1), characterized in that at least one IR image (6) is recorded with interchangeable IR lens (5), in that one or more features are extracted from the one or more IR images (6), with the one or more features being influenced by the distortion of interchangeable IR lens (5), in that a numerical value (14) determined by the distortion of interchangeable IR lens (5) is derived from the one or features, and in that at least one lens characteristic (17, 18, 19) correlated with numerical value (14) is read out from a stored mapping (16) of lens characteristics (17, 18, 19) with numerical values (14).

7. Method according to claim 6, characterized in that at least one extracted feature is an edge (8, 9, 27) and/or that one or more of the following lens characteristics (17, 18, 19) are stored: focal length, transmission coefficient(s), distortion or photographic luminous intensity.

8. Method according to claim 6, characterized in that at least two recorded IR images (6) are evaluated during the feature extraction, in particular, that a peripheral area (25) is evaluated in a first IR image (6) and in the first or a second IR image (6) a central area (26) is evaluated and/or that at least one radius of curvature of a linear structure (7, 8, 9, 27) is determined in the one or more IR images (6) in order to derive the numerical value (14).

9. Method according to claim 6, characterized in that a vector field is calculated for the one or more IR images (6) by means of a color level or gray level progression and/or in that a vector summed up over a partial area of IR image (6) is calculated.

10. Method according to claim 9, characterized in that, from the summed-up vectors for a sequence of IR images (6), a vector averaged over the sequence is calculated and/or in that object (3) is imaged in a sequence of at least two IR images (6) in different image areas (25, 26), in particular, in a peripheral area (25) and in a central area (26), in that object (3) is identified in the two or more IR images (6), in that at least one respective feature is extracted from the imaged object (3) for each IR image (6), and in that the numerical value (14) is derived from the comparison of the extracted features.

11. Method according to claim 6, characterized in that the movement of object (3) between two successive IR images (6) is determined by calculating the mapping and/or by a motion sensor.

12. Method for processing an IR image (6) recorded with a thermal imaging camera (1), characterized in that at least one lens characteristic (17, 18, 19) is determined in a method according to claim 6, and in that the one or more lens characteristics (17, 18, 19) are used in the processing of the recorded IR image (6).

* * * * *

UNITED STATES PATENT AND TRADEMARK OFFICE
CERTIFICATE OF CORRECTION

PATENT NO. : 8,247,770 B2  
APPLICATION NO. : 12/716005  
DATED : August 21, 2012  
INVENTOR(S) : Jörn Fischer It is certified that error appears in the above-identified patent and that said Letters Patent is hereby corrected as shown below:

In the Specification:

Column 4, lines 52-53, replace "characteristics 17, 8, 19 are used" with --characteristics 17, 18, 19 are used--.

In the Claims:

Column 6, line 12, claim 6 replace "from the one or features" with --from the one or more features--.

Signed and Sealed this  
Twenty-sixth Day of November, 2013

Margaret A. Focarino  
*Commissioner for Patents of the United States Patent and Trademark Office*